(12) United States Patent
Huelsemann (10) Patent No.: US 8,727,923 B2
(45) Date of Patent: May 20, 2014

(54) DRIVETRAIN

(75) Inventor: Ulrich Huelsemann, Neuhausen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 355 days.

(21) Appl. No.: 13/017,728

(22) Filed: Jan. 31, 2011

(65) Prior Publication Data

US 2011/0195811 A1  Aug. 11, 2011

(30) Foreign Application Priority Data

Feb. 5, 2010  (DE) .......................... 10 2010 007 638

(51) Int. Cl.
*F16H 3/72* (2006.01)
(52) U.S. Cl.
USPC ............................................ 475/5; 74/606 R
(58) Field of Classification Search
None
See application file for complete search history.

(56) References Cited

U.S. PATENT DOCUMENTS

| 5,419,406 | A | 5/1995 | Kawamoto et al. |
| 6,276,474 | B1 | 8/2001 | Ruppert et al. |
| 7,841,435 | B2 | 11/2010 | Raue |
| 2006/0118344 | A1 | 6/2006 | Rosch |

FOREIGN PATENT DOCUMENTS

| DE | 199 09 424 | 8/2000 |
| DE | 10 2006 014 514 | 10/2007 |
| DE | 10 2006 038 396 | 2/2008 |
| JP | 2000-135931 | 5/2000 |
| JP | 2002-168980 | 6/2002 |
| JP | 2003-328895 | 11/2003 |

*Primary Examiner* — Erin D Bishop
(74) *Attorney, Agent, or Firm* — Gerald E. Hespos; Michael J. Porco; Matthew T. Hespos (57) ABSTRACT

A drivetrain has at least one drive machine (2, 3) with a drive output shaft (6) that can be coupled via a transmission (10) to at least one drive wheel. The transmission (10) is mounted on the drive machine (2, 3) and has a planetary gear set (18). To reduce the expenditure for the development and/or manufacture of the drivetrain, the transmission (10) has different mounting positions rotated relative to the drive output shaft (6) of the drive machine (2, 3).

15 Claims, 12 Drawing Sheets

DRIVETRAIN

CROSS-REFERENCE TO RELATED APPLICATION

This application claims priority under 35 USC 119 to German Patent Application No. 10 2010 007 638.4, filed on Feb. 5, 2010, the entire disclosure of which is incorporated herein by reference.

BACKGROUND OF THE INVENTION

1. Field of the Invention

The invention relates to a drivetrain having at least one drive machine with a drive output shaft that can be coupled via a transmission to at least one drive wheel. The transmission is mounted on the drive machine and comprises a planetary gear set. The invention also relates to a hybrid vehicle having a primary drive machine and a secondary drive machine in a drivetrain of said type.

SUMMARY OF THE INVENTION

The invention relates to a drivetrain having at least one drive machine with a drive output shaft that can be coupled via a transmission to at least one drive wheel. The transmission is mounted on the drive machine and comprises a planetary gear set. The transmission has different mounting positions rotated relative to the drive output shaft of the drive machine and preferably is a speed reduction transmission. A relatively high drive rotational speed of the drive machine can be reduced to a desired wheel rotational speed by means of a suitable step-down ratio. The drivetrain preferably is a hybrid drivetrain having an internal combustion engine and at least one electric machine. The at least one electric machine preferably comprises two electric machines, and a transmission preferably is mounted on each electric machine. The transmission of the invention optimally uses the available installation space in a motor vehicle in a simple manner.

Each transmission preferably can be rotated by a defined angle range between the different mounting positions to conform to the available installation space in the motor vehicle. The defined angle range preferably is sixty degrees.

The drivetrain preferably has two electric machines on which two transmissions of identical design are mounted. The drive output shafts of the electric machines preferably have coaxial rotational axes and extend in opposite directions from the electric machines that are mounted on one another. The two transmissions are mounted respectively on the ends of the electric machines that face away from one another.

The transmission preferably comprises a transmission housing with an intermediate cover that faces toward the drive machine. The intermediate cover has different mounting positions rotated relative to the transmission housing. The intermediate cover can be rotated in each case by a defined angle range between the different mounting positions. The angle range preferably is thirty degrees.

The intermediate cover preferably has a plurality of fluid ports, such as high-pressure ports, that can be assigned different functions depending on the mounting positions of the intermediate cover and/or the transmission. Three high-pressure ports preferably are provided on the intermediate cover. However, only two of the ports are used. The third high-pressure port preferably is not used and therefore is closed off.

The transmission preferably has a plurality of drain openings that are assigned different functions depending on the mounting position of the transmission. The transmission preferably has two drain openings. One of the drain openings preferably is closed off by a drain screw. If required, the drain screw can be unscrewed to drain oil out of the transmission. A sensor, such as a temperature sensor, may be arranged in the other drain opening.

The transmission preferably comprises a spur gear installation space for different spur gear pairs. Different transmission ratios can be realized in a simple manner by the different spur gear pairs. The size of the spur gear installation space therefore is matched to the different spur gear pairs.

The transmission preferably comprises a multiplate clutch with inner plates and outer plates that engage with an external toothing into an internal toothing formed in the transmission housing. The internal toothing formed directly in the transmission housing preferably is eroded and hard-coated.

The inner plates preferably have an internal toothing that engages with an external toothing formed on an internal gear of the planetary gear set. The multiplate clutch preferably is arranged radially outside the internal gear of the planetary gear set so as to overlap the internal gear in the axial direction. The expressions axial and radial relate to the axis of rotation of the drive output shaft of the electric machine. Axial means in the direction of or parallel to the axis of rotation of the drive output shaft. Radial means in a transverse direction with respect to the axis of rotation of the drive output shaft of the electric machine. The integration of the toothings into the internal gear of the planetary gear set and into the transmission housing enables the size of the transmission to be reduced considerably.

The invention also relates to a hybrid vehicle having a primary drive machine and a secondary drive machine in a drivetrain as described above. The primary drive machine preferably is an internal combustion engine. The secondary drive machine preferably comprises two electric machines that are mounted on one another. A transmission as described above is mounted on each of the electric machines.

Further advantages, features and details of the invention will emerge from the following description which describes different exemplary embodiments in detail with reference to the drawing, in which:

DETAILED DESCRIPTION OF THE PREFERRED EMBODIMENTS

Figure 1:
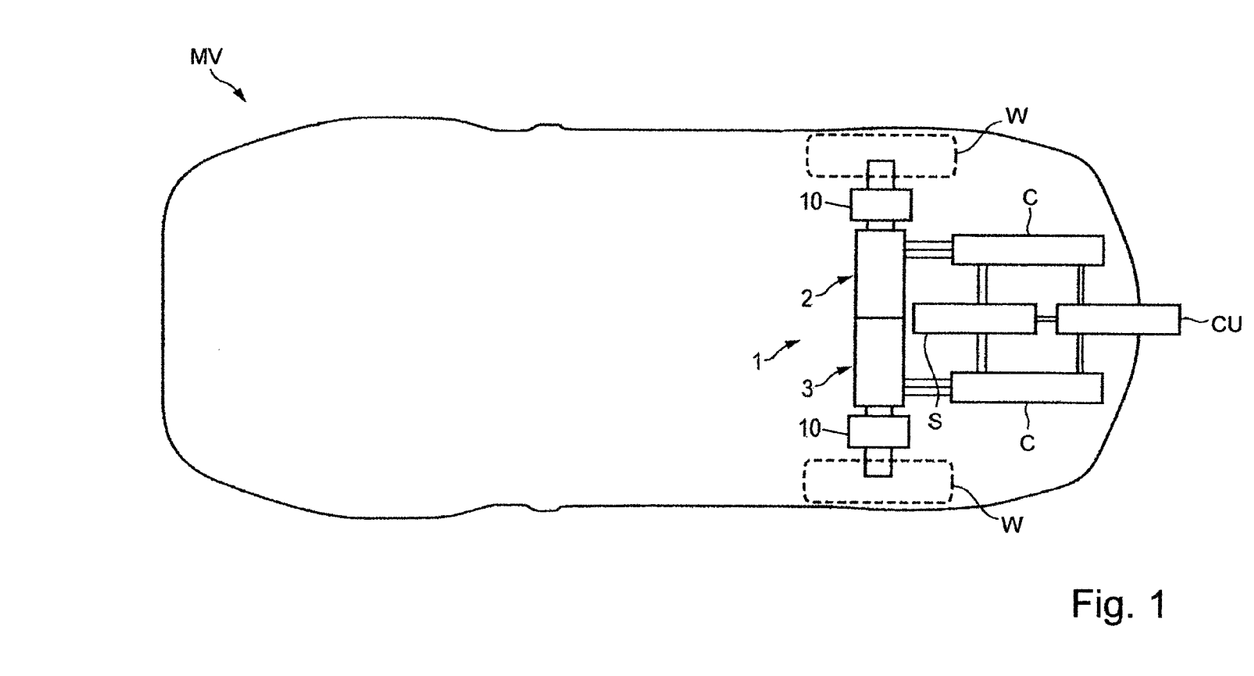
FIG. 1 is a schematic illustration of a motor vehicle that incorporates a drivetrain according to the invention.
Figure 2:
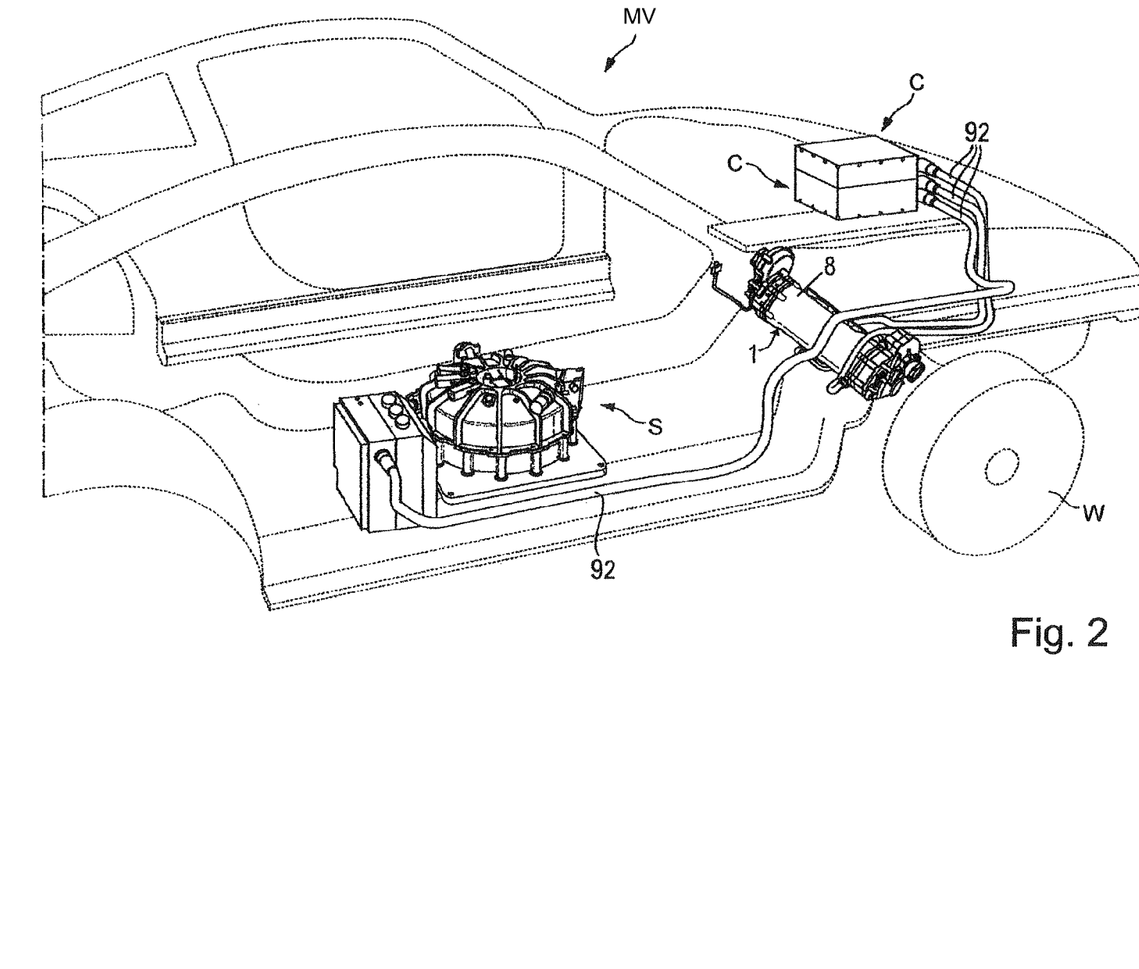
FIG. 2 is a perspective view of a motor vehicle shown as transparent with one embodiment of the drivetrain incorporated therein.

FIGS. 1 to 14 illustrate a drivetrain according to the invention in different views or details. A motor vehicle in accordance with the invention is identified by the letters MV in FIGS. 1 and 2. The motor vehicle MV is a hybrid vehicle and has a hybrid drivetrain that includes an electric machine arrangement 1 with two electric machines 2, 3 combined in a common machine housing 8. The hybrid drive train also includes a storage S, which in FIG. 2 is illustrated as a flywheel storage device. However, the storage S also may be a battery, such as a high voltage battery. The storage S is operative to supply the electric machine arrangement 1 with electrical power when necessary. The hybrid drivetrain further includes a converter C for converting between direct and alternating current and a control unit CU for controlling the operation of the various components of the hybrid drivetrain. Cables 92 connect the electric machine arrangement 1 to the storage S and the converters C.

Figure 4:
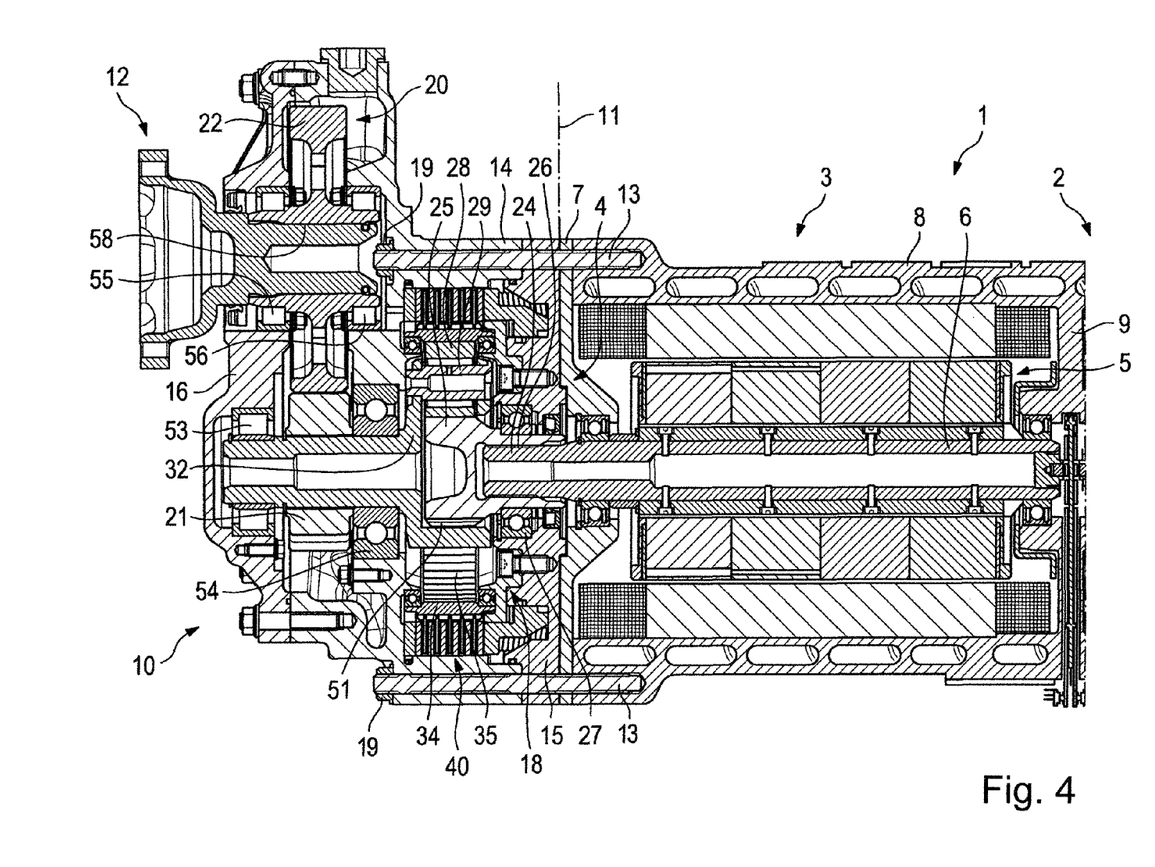
FIG. 4 is a longitudinal cross sectional view of the drivetrain.

Most of the electric machine 2 has been cropped in FIG. 4. The two electric machines 2, 3 are of identical design. Thus, FIG. 4 shows a rotor 5 with a drive output shaft 6 and an identical rotor and drive output shaft are present in the electric machine 2, but are not illustrated. The machine housing 8 is closed off at a transmission-side ends by bearing covers 7 and a fixed bearing for the drive output shaft 6 is provided in the bearing cover 7. The machine housing 8 has a partition 9 between the two electric machines 2, 3 and a floating bearing for the drive output shaft 6 is provided in the partition 9. The partition 9 constitutes an axis or plane of symmetry for the part of the drivetrain illustrated in FIG. 4.

Figure 3:
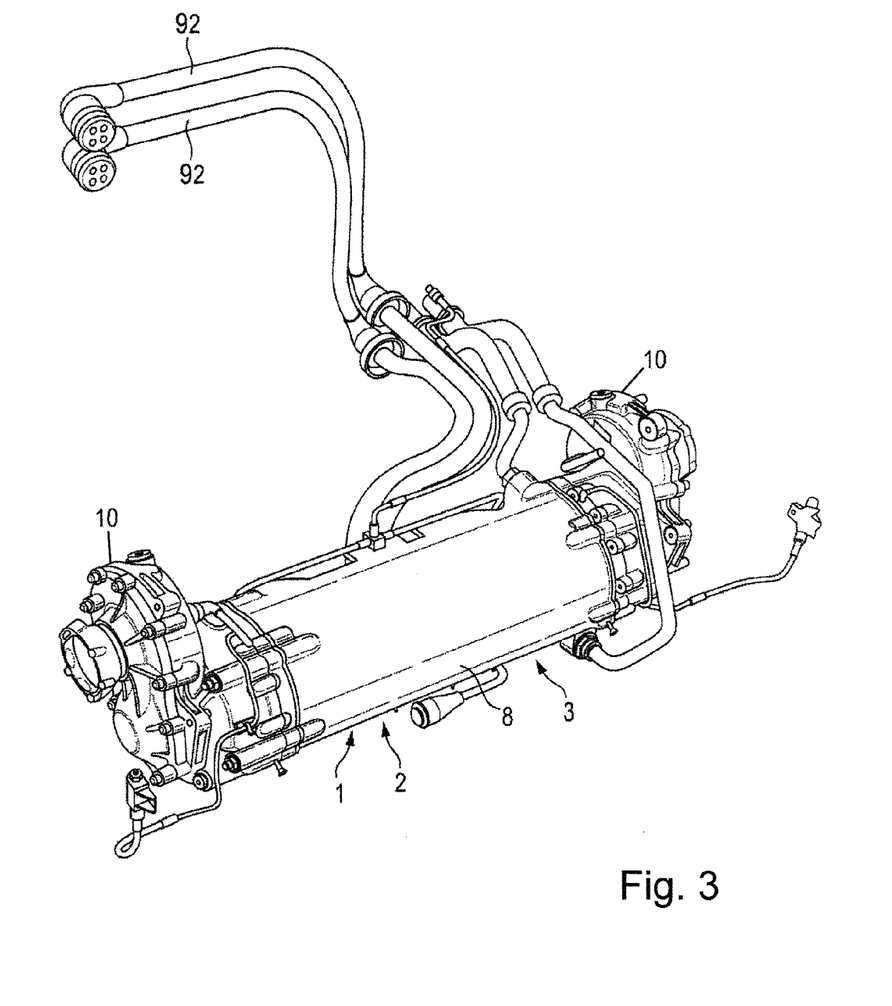
FIG. 3 is a perspective view of the drivetrain.

Transmissions 10 are mounted on the transmission-side ends of the machine housing 8. The numeral 11 denotes a parting line between the transmission 10 and the electric machine arrangement 1 in FIG. 4. The second transmission 10 shown in FIGS. 1 through 3 is not illustrated in the remaining figures, but the two transmissions 10 are of identical design.

The transmissions 10 function to provide a driving connection between a drive wheel W of the motor vehicle MV and the electric machine 2, 3. To connect the drive wheel W, a joint flange 12 is attached to the transmission 10. The transmission 10 is designed as a modular speed reduction transmission.

Each transmission 10 comprises a transmission housing 14 that can be mounted in different positions on the machine housing 8 by means of stud bolts 13 and nuts 19. A total of six stud bolts 13 are arranged in a regular hole pattern. Thus, the mounting position of the transmission 10 can be rotated in a simple manner relative to the axis of rotation of the drive output shaft 6 of the electric machine arrangement 1 in sixty-degree steps so that the transmission 10 optimally uses the available installation space in the motor vehicle MV in a simple manner.

To position the transmission 10, a centering diameter is provided on an intermediate cover 15 of the transmission 10. The intermediate cover 15, also referred to as a barrier cover, comprises, for centering, an encircling step with that engages into a corresponding recess on the bearing cover 7 of the machine housing 8.

The intermediate cover 15 closes off the transmission housing 14 in the direction of the electric machine arrangement 1. The parting line 11 extends between the bearing cover 7 of the electric machine arrangement 1 and the intermediate cover 15 of the transmission 10. The opposite side of the transmission housing 14 is closed off by an outer cover 16 through which the joint flange 12 extends.

The intermediate cover 15 can be fastened rotatably in thirty-degree steps to the transmission housing 14 by screw connections with a suitable hole pattern. Three high-pressure connection ports 94 preferably are provided at radially outer positions of the intermediate cover 15. However only two ports 94 are used and the third port 94 is closed off.

The position of the high-pressure ports 94 can be varied in a simple manner by rotating the intermediate cover 15 relative to the transmission housing 14. In particular, the intermediate cover 15 can always can be rotated relative to the transmission housing 14 so that one port 94 is at the top to allow ventilation.

A further port preferably is arranged offset with respect to the first port by one hundred and twenty degrees. A multiplate clutch 40, which is actuated hydraulically via the second port, permits emergency running operation, as described further below.

The transmission 10 comprises a planetary gear set 18 and a spur gear mechanism with a spur gear pair 20. The spur gear pair 20 comprises an inner spur gear 21 and an outer spur gear 22. The spur gear mechanism is of modular design and comprises a plurality of spur gear pairs that make different transmission ratios possible to adapt the transmission 10 to different requirements.

The holding space for the spur gear pair 20 is formed in the transmission housing 14 in such a way that it can hold spur gears 21, 22 of different sizes. In this way, the transmission 10 can be adapted in a simple manner for example to a specific racetrack. The spur gear mechanism with the spur gear pair 20 can be exchanged quickly and easily after the joint flange 12 and the outer cover 16 are dismounted.

A drive output shaft stub 24 of the drive output shaft 6 extends through the bearing cover 7 of the electric machine arrangement 1 and through the intermediate cover 15 of the transmission 10. A sun gear 25 of the planetary gear set 18 is connected to the drive output shaft stub 24 for conjoint rotation therewith by means of a spline toothing 26.

The sun gear 25 meshes with three planet gears, only one of which is visible in FIG. 4. The planet gear 28 is rotatably mounted in a planet carrier 32 by means of a bearing journal 29. It can be seen in FIG. 2 that a needle-roller bearing 30 is provided for rotatably mounting the planet gear 28. The planet gears 28 mesh with an internal gear 34 which, for this purpose, as can be seen in FIG. 1, is provided with an internal toothing 35.

Figure 5:
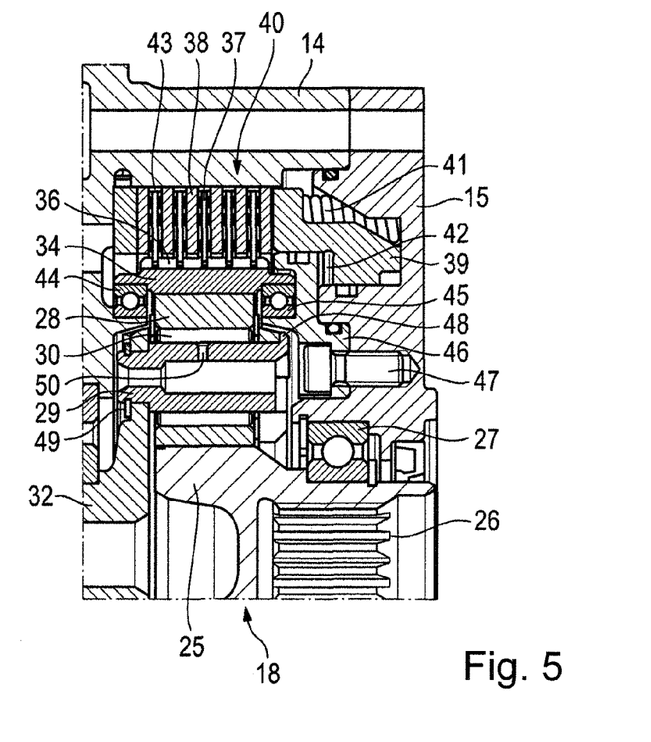
FIG. 5 shows an enlarged detail from FIG. 4 with a planetary gear set and a friction clutch in half-section.

As shown in FIG. 5, the internal gear 34 has an external toothing 36 in addition to the internal toothing 35. The external toothing 36 connects the internal gear 34 to inner plates 37 of the multiplate clutch 40 for conjoint rotation therewith. The inner plates 37 are in frictional engagement with outer plates 38 of the multiplate clutch 40.

The frictional engagement of the inner plates 37 with the outer plates 38 is produced by an actuating piston 39 that is preloaded in the axial direction against the plates 37, 38 by compression springs 41, such as helical compression springs. The frictional engagement between the plates 37, 38 may be eliminated by charging a pressure chamber 42 with hydraulic pressure counter to the preload force of the compression springs 41 to permit emergency running.

The side of the actuating piston 39 facing away from the plates 37, 38 has recesses for holding a part of the compression springs 41. Similar recesses for holding another part of the compression springs 41 are provided in the intermediate cover 15. Tongue-and-groove guides connect the actuating piston 39 to the intermediate cover 15 in a rotationally fixed but axially movable manner. The tongue-and-groove guides simultaneously form axial stops for the actuating piston 39.

The inner plates 37 of the multiplate clutch 40 are seated with a driver toothing directly on the internal gear 34. The inner plates 37 have a spline toothing radially at the inside. The external toothing 36 that engages into said spline toothing of the internal gear 34 also is referred to as a driver toothing.

The outer plates 38 have an external toothing that engages an internal toothing 43 formed directly in the transmission housing 14. The internal toothing 43 is eroded directly into the transmission housing 14 and preferably is made of aluminum that is hard-coated.

The internal gear 34 is mounted rotatably by two bearings 44, 45 that preferably are thin-ring bearings. The internal gear 34 is guided at both sides by the bearings 44, 45. The bearing 44 is supported radially at the inside on the transmission housing 14. The bearing 45 is supported radially at the inside on a bearing carrier 46 and the bearing carrier 46 is fastened by screws 47 to the intermediate cover 15. Radially at the outside, the actuating piston 39 is guided in an axially movable manner on the bearing carrier 46.

One end of the bearing journal 29 is connected by a collar 48 to the planet carrier 32 in a positively locking fashion and the other end of the bearing journal 29 is held on the planet carrier 32 by an axial securing ring 49. The collar 48 is reduced by a half. The positive locking at one end and the axial securing ring 49 at the other end provides combined axial and rotational locking of the bearing journal 29 on the planet carrier 32. The bearing journal 29 also comprises an oil passage bore 50 that makes lubrication of the needle-roller bearing 30 possible in a simple manner.

FIG. 4 shows that the sun gear 25 meshes by means of an external toothing 51 with the planet gears 28 and is rotatably mounted on the planet carrier 32. The planet carrier 32 in turn is mounted rotatably by bearings 53, 54. One end of the planet carrier 32 is mounted in the outer cover 16 of the transmission 10 by the floating bearing 53. The planet carrier 32 is mounted in the transmission housing 14 by the fixed bearing 54. The inner spur gear 21 is arranged in the axial direction between the two bearings 53 and 54 and is held by an axial securing ring.

The outer spur gear 22 is mounted rotatably by two further bearings 55, 56. More particularly, the outer spur gear 22 is mounted in the outer cover 16 of the transmission 10 by means of the bearing 55 and is mounted in the transmission housing 14 by means of the bearing 56. The joint flange 12 is connected to the outer spur gear 22 for conjoint rotation therewith by means of a spline toothing 58.

The transmission 10 is filled with transmission oil for lubrication and/or cooling. An end outer plate 60 of the multiplate clutch 40 is modified so that oil can pass through from radially inside to radially outside, as indicated by an arrow 62 in FIG. 3. The targeted passage of oil radially to the outside considerably reduces the power losses of the multiplate clutch 40 in the open state.

Radial grooves, in this case five radial grooves, are formed in the end plate or end outer plate 60 to permit the passage of oil or the escape of oil. In addition to the radial grooves, a rotary contour in the form of a recess is formed on the end outer plate 60 radially at the outside.

Thus, oil can be conducted radially, out into a channel 64 in the transmission housing 14 in a simple manner. The escaping oil passes from the channel 64 into the holding space for the spur gear pair 20.

Figure 8:
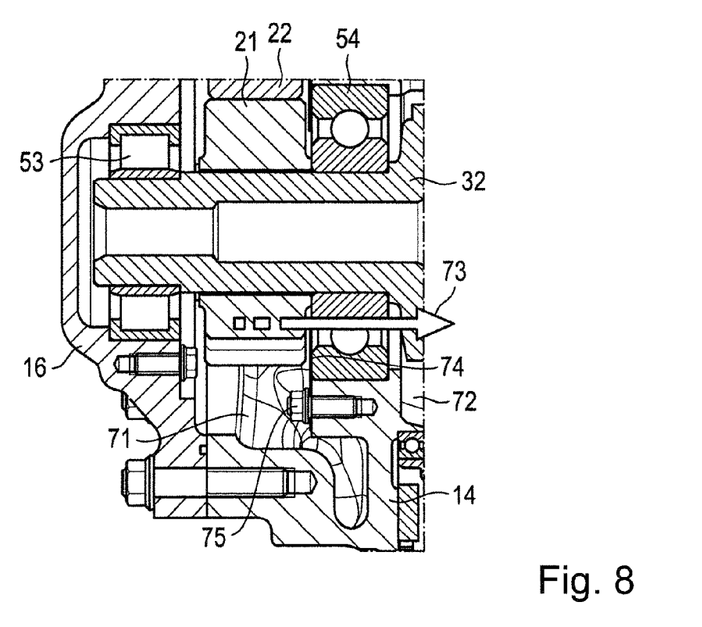
FIG. 8 shows an enlarged detail from FIG. 4 with a bearing retaining plate.
Figure 9:
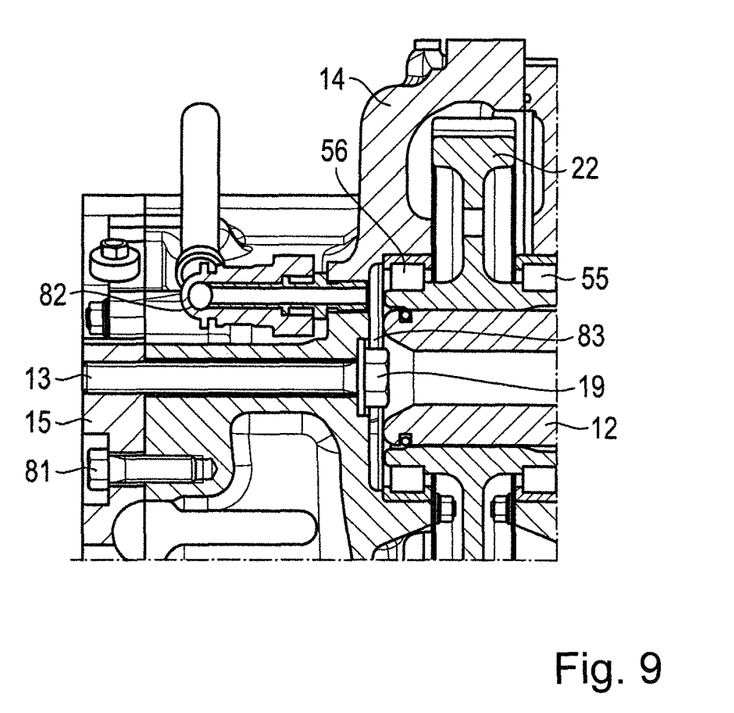
FIG. 9 shows an enlarged detail from FIG. 4 with a ventilation port.
Figure 10:
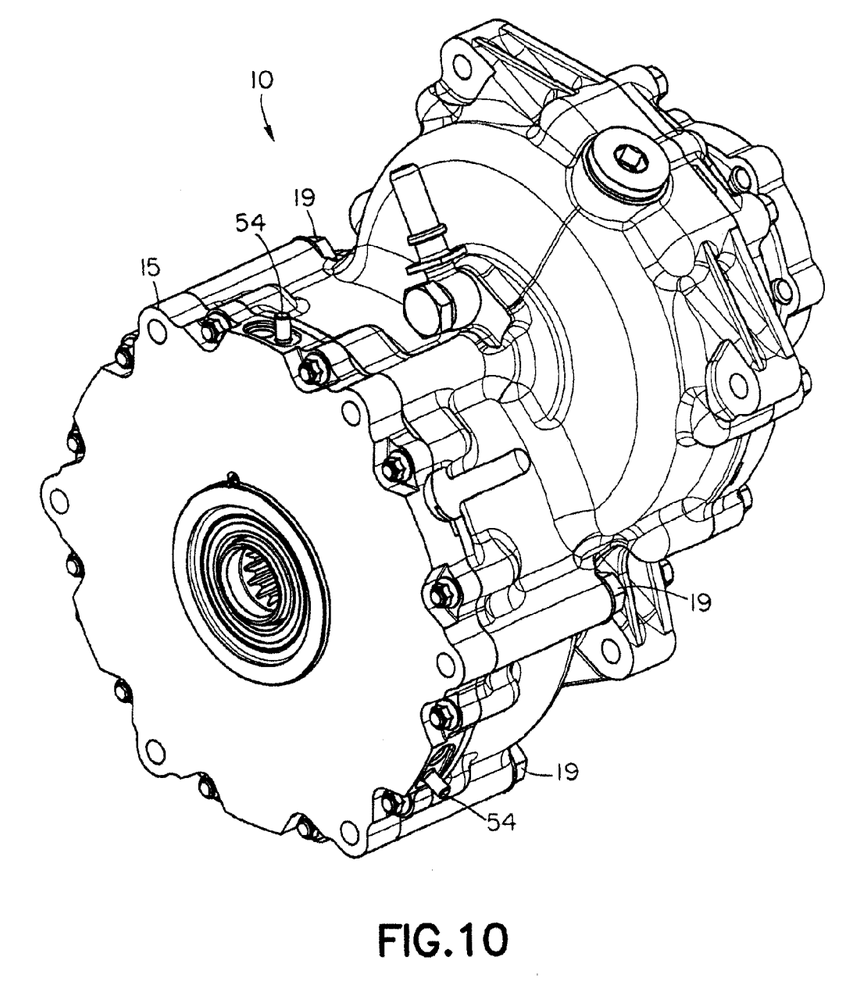
FIG. 10 is a perspective view of the transmission of the drivetrain.
Figure 11:
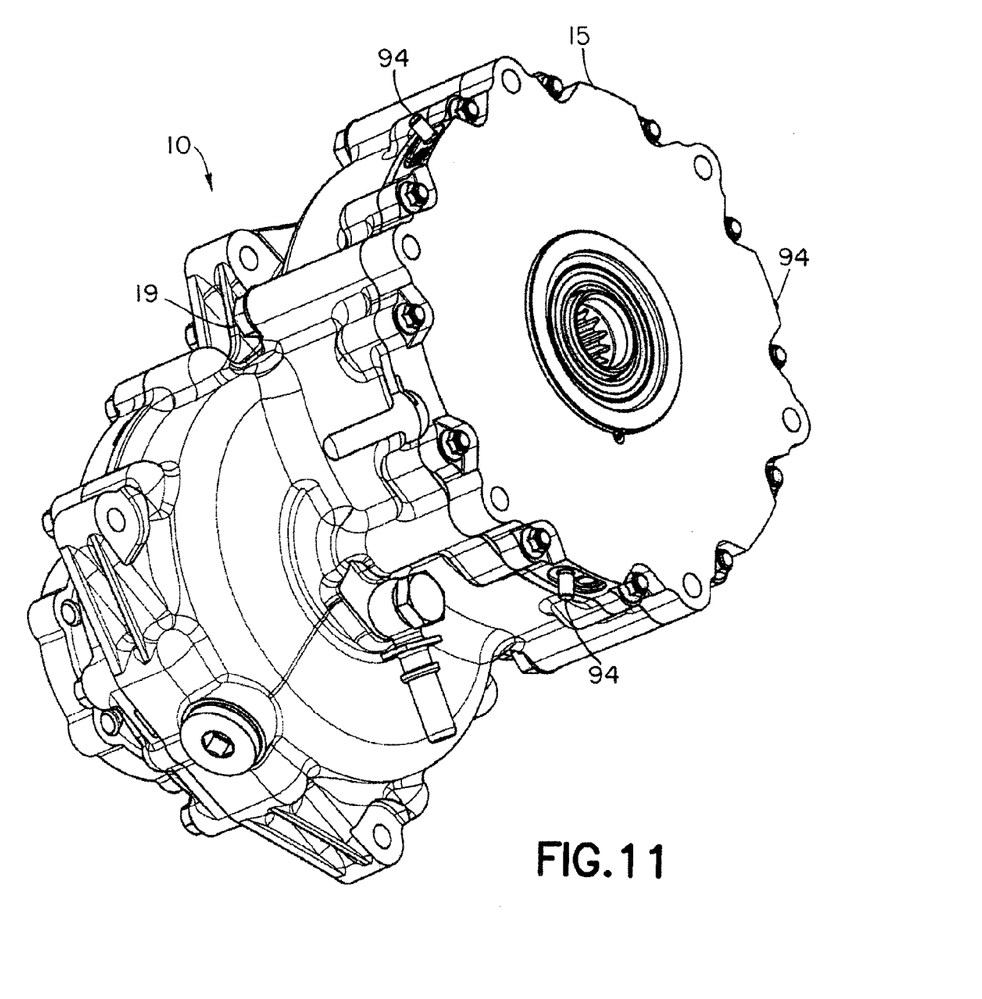
FIG. 11 is a second perspective view of the transmission.

FIG. 8 shows that a snap ring 66 attaches the joint flange 12 to the outer spur gear 22 in such a way that the joint flange can be repeatedly detached in a non-destructive manner. Thus, the joint flange 12 can be dismounted in a simple manner by applying a tensile force. Dismounting the joint flange 12 gives access to the nut 19 and the associated stud bolt 13 arranged behind the joint flange 12 for assembly purposes. The attachment of the joint flange therefore contributes to a regular and symmetrical screw connection hole pattern.

The two spur gears 21, 22 are arranged in a first oil chamber 71 of the transmission 10, as shown in FIG. 5. The first oil chamber 71 also is referred to as the spur gear oil chamber or spur gear installation space. A second oil chamber 72 is assigned to the planetary gear set. During operation of the transmission 10, more oil is required in the first oil chamber 71. Accordingly, the passage indicated by an arrow 73 from the first oil chamber 71 to the second oil chamber 72 is restricted by a bearing retaining plate 74.

The bearing retaining plate 74 is fastened to the transmission housing 14 by screws 75 and is modified so that the passage of oil through the bearing 44 is considerably reduced. Here, a small residual gap remains open between the bearing retaining plate 74 and the bearing inner ring of the bearing 54 so that adequate lubrication is maintained even with a restricted passage of oil.

Figure 12:
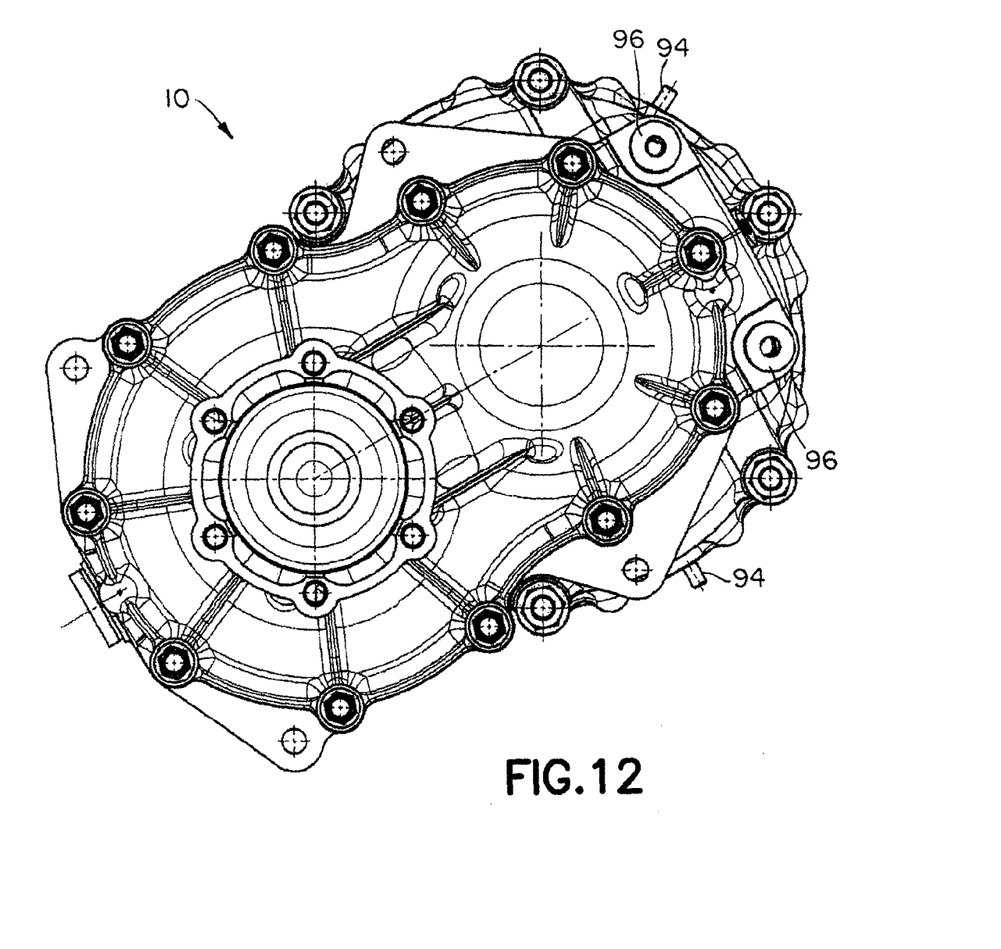
FIG. 12 is an end elevational view of the transmission.
Figure 13:
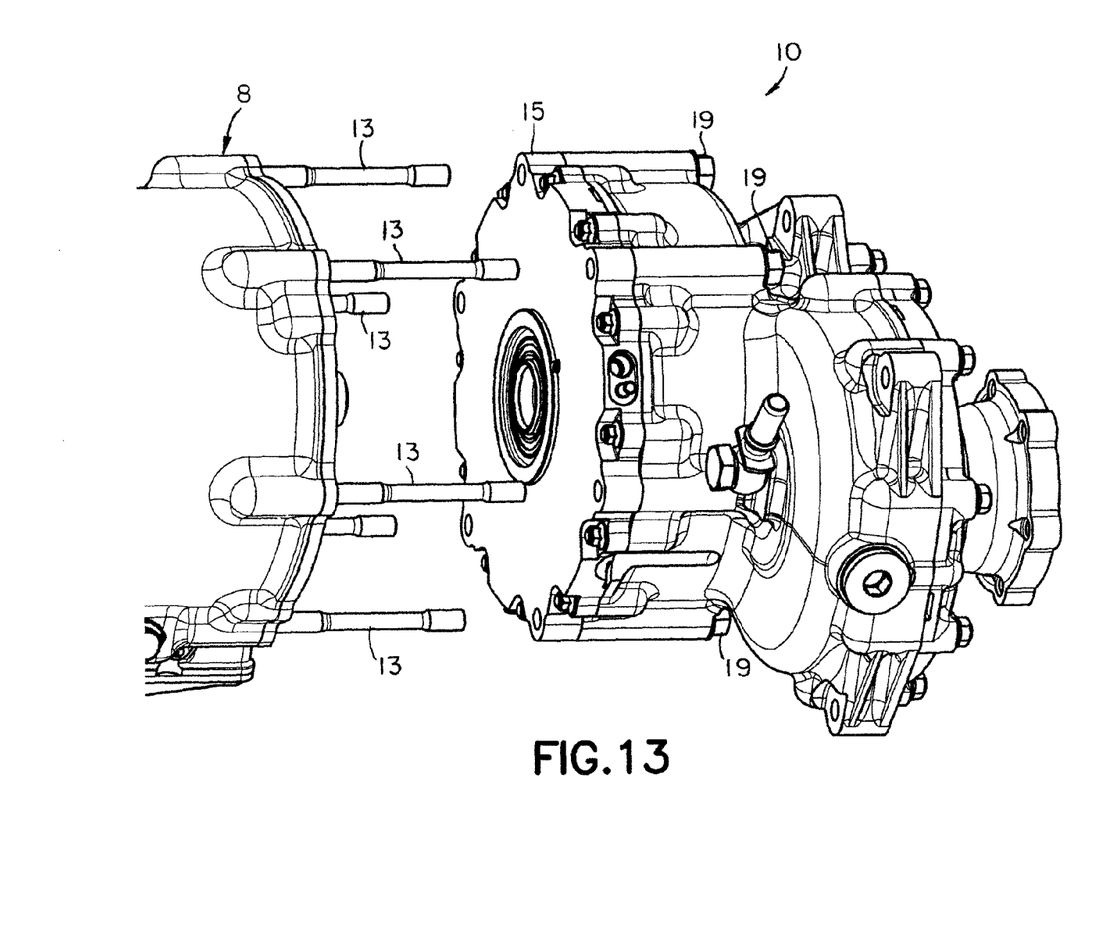
FIG. 13 is an exploded perspective view of the transmission and the housing of the drivetrain.
Figure 14:
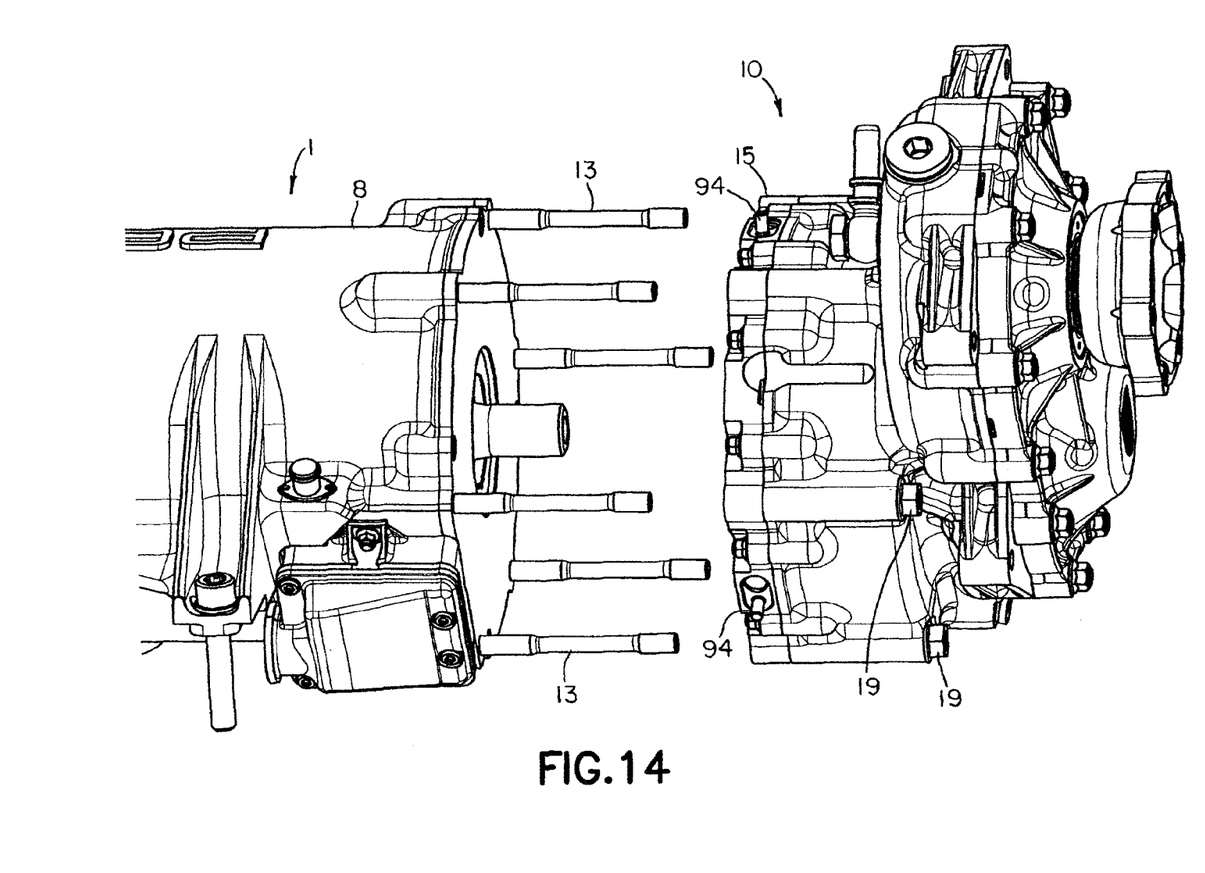
FIG. 14 is a second exploded perspective view of the transmission and the housing of the drivetrain.

Two drain openings 96 with internal threads preferably are provided on the transmission housing 14, as shown in FIG. 12. In the installed state of the transmission 10, a drain screw is screwed into the lower of the two drain openings 96 to close the drain opening 96. A temperature sensor preferably is screwed into the upper of the two drain openings 96.

Further regions of the multiplate clutch 40 are provided with a targeted oil conduit to reduce power losses. For this purpose, individual teeth in the internal toothing 43 of the transmission housing 14 are intentionally omitted and combined with axial passage openings. In addition, it is possible by means of a recess to provide an annular chamber that permits a passage of oil in the circumferential direction to the axial oil passage openings.

By means of the oil conduit, it is possible for oil to be displaced in a targeted fashion out of the second oil chamber 72 into the first oil chamber 71, also referred to as the spur gear oil chamber. In this way, power losses can be reduced considerably, in particular at high rotational speeds.

With increasing rotational speed, the rotating inner plates 37 of the multiplate clutch 40 ensure that oil is conveyed radially to the outside. Oil first is displaced into the annular chamber through spaces formed by the removal of preferably five housing teeth in the internal toothing 43. The oil then is displaced through the axial openings or apertures into the first oil chamber 71.

Figure 6:
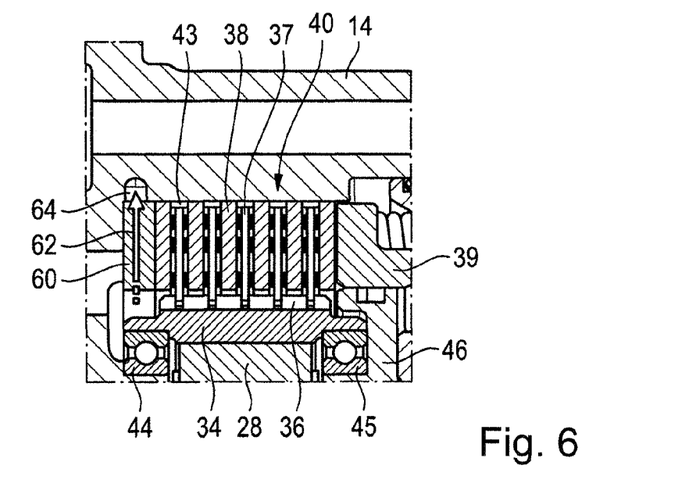
FIG. 6 shows an enlarged detail from FIG. 5.
Figure 7:
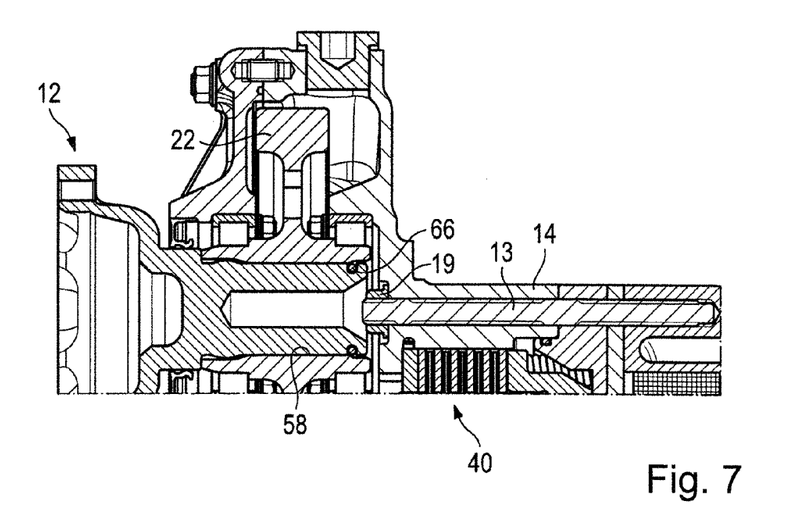
FIG. 7 shows an enlarged detail from FIG. 4 in the region of a screw connection behind a joint flange.

FIG. 6 shows a screw 81 for fastening the intermediate cover 15 to the transmission housing 14. A ventilation port 82 is provided on the transmission housing in a calmed zone behind a bearing seat of the bearing 56. The ventilation port 82 is connected to a calmed space 83 behind the bearing 56.

What is claimed is:

1. A drivetrain comprising: at least one drive machine with a machine housing and a drive output shaft, at least one transmission coupled to the drive output shaft and configured to be coupled to at least one drive wheel, the transmission having a planetary gear set and a transmission housing, the transmission housing having transmission housing mounting structures disposed on the transmission housing and configured for mounting the transmission on the drive machine at different mounting positions of the transmission relative to the drive machine, wherein the different mounting positions of the transmission are rotated relative to the drive output shaft of the drive machine so that the transmission can be mounted at a selected one of the mounting positions that utilizes available installation space.

2. The drivetrain of claim 1, wherein the transmission can be rotated by defined angle ranges between the different mounting positions.

3. The drivetrain of claim 1, wherein the at least one drive machine is one of two electric machines and the at least one transmission is one of two identical transmissions mounted respectively on the electric machines.

4. The drivetrain of claim 1, wherein the transmission has at least first and second drain openings, the first drain opening being lower than the second drain opening in a first of the mounting positions of the transmission, and the second drain opening being lower than first drain opening in a second of the mounting positions of the transmission, a drain screw being mounted in the first drain opening and a sensor being mounted in the second drain opening when the transmission is in the first mounting position, and the drain screw being mounted in the second drain opening and the sensor being mounted in the first drain opening when the transmission is in the second mounting position.

5. The drivetrain of claim 1, wherein the transmission comprises a spur gear installation space configured for accommodating one of a plurality of spur gear pairs of different respective sizes.

6. The drivetrain of claim 1, wherein the transmission further has an intermediate cover that faces toward the drive machine, the intermediate cover having intermediate cover mounting structures disposed on the intermediate cover and configured for mounting the intermediate cover to the transmission housing at any of a plurality of different mounting positions of the intermediate cover rotated relative to the transmission housing.

7. The drivetrain of claim 6, wherein the intermediate cover has a plurality of fluid ports, the drivetrain further having at least one fluid line connectable to any one of the fluid ports, with the fluid port that is connected to the fluid line being selected depending on the mounting position of the intermediate cover or the transmission.

8. The drivetrain of claim 6, wherein the transmission comprises a multiplate clutch with inner plates and outer plates that engage frictionally with the inner plates, the outer plates having an external toothing that engages with an internal toothing formed in the transmission housing.

9. The drivetrain of claim 8, wherein the internal toothing formed in the transmission housing is a first internal toothing, and the inner plates have a second internal toothing that engages an external toothing formed on an internal gear of the planetary gear set.

10. A hybrid vehicle having an internal combustion engine and the drivetrain of claim 1.

11. A motor vehicle comprising:
a drivetrain installation space; and
an electric machine arrangement in the drivetrain installation space, the electric machine arrangement having:
a machine housing with opposite first and second ends spaced from one another along an axis,
first and second electric machines in substantially end to end relationship along the axis and disposed in the machine housing so that the first electric machine is in proximity to the first end of the machine housing and the second electric machine is in proximity to the second end of the machine housing, the first and second electric machines provided respectively with first and second drive output shafts extending along the axis,
first and second transmissions coupled respectively to the first and second drive output shafts, and
first and second transmission housings mounted respectively to the first and second ends of the machine housing and substantially surrounding the respective first and second transmissions, the first and second transmission housings each having a protruding part that protrudes beyond the machine housing in a direction transverse to the axis, each of the transmission housings each having transmission housing mounting structures disposed on the respective transmission housing and configured for mounting the respective transmission housings on the machine housing at different mounting positions of the transmission housings relative to the machine housing, with the different mounting positions of the transmission housings being rotated relative to the drive output shafts so that the protruding parts of the transmission housings can be mounted at a selected one of the mounting positions of the transmission housing that utilizes the drivetrain installation space.

12. The motor vehicle of claim 11, wherein each of the transmissions has a spur gear pair disposed in the protruding part of the respective transmission housing.

13. The motor vehicle of claim 11, wherein each of the transmission housings has at least a first drain opening and a second drain opening, the first drain opening being lower than the second drain opening in a first of the mounting positions of the respective transmission housing, and the second drain opening being lower than the first drain opening in a second of the mounting positions of the respective transmission housing, a drain screw being mounted in the first drain opening and a sensor being mounted in the second drain opening when the respective transmission housing is in the first mounting position, and the drain screw being mounted in the second drain opening and the sensor being mounted in the first drain opening when the respective transmission housing is in the second mounting position.

14. The motor vehicle of claim 11, wherein each of the transmissions has an intermediate cover that faces toward the machine housing, each of the intermediate covers having intermediate cover mounting structures disposed on the respective intermediate cover and configured for mounting the respective intermediate cover to the respective transmission housing at any of a plurality of different mounting positions of the respective intermediate cover rotated relative to the respective transmission housing.

15. The motor vehicle of claim 14, wherein each of the intermediate covers has a plurality of fluid ports, the motor vehicle further having at least one fluid line connectable to any one of the fluid ports, with the fluid line being connected to a selected one of the fluid ports depending on the mounting position of the respective intermediate cover.

* * * * *